United States Patent [19]
Abensour et al.

[11] Patent Number: 5,490,140
[45] Date of Patent: Feb. 6, 1996

[54] SYSTEM AND METHOD FOR PROVIDING ATM SUPPORT FOR FRAME RELAY DTES WITH A TERMINAL ADAPTER

[75] Inventors: Daniel S. Abensour; Jon E. Fox, both of Cary; Mahendra J. Joshi; Fuyung Lai, both of Raleigh; Kian-Bon K. Sy, Cary, all of N.C.

[73] Assignee: International Business Machines Corporation, Armonk, N.Y.

[21] Appl. No.: 316,674

[22] Filed: Sep. 30, 1994

[51] Int. Cl.$^6$ .............................. H04Q 11/04; H04J 3/24
[52] U.S. Cl. .................... 370/60.1; 370/79; 370/85.13; 370/94.2
[58] Field of Search .................... 370/94.1, 60, 60.1, 370/79, 82, 94.2, 110.1, 85.13, 94.3, 17, 58.1, 58.2, 58.3, 85.14, 91; 379/399

[56] References Cited

U.S. PATENT DOCUMENTS

| | | | |
|---|---|---|---|
| 5,208,811 | 5/1993 | Kashio et al. | 370/94.1 |
| 5,231,631 | 7/1993 | Buhrke et al. | 370/110.1 |
| 5,280,476 | 1/1994 | Kojima et al. | 370/60.1 |
| 5,365,524 | 11/1994 | Hiller et al. | 370/94.2 |

OTHER PUBLICATIONS

Mimoli et al. "ATM & Cell Relay Service for Corporate Environments", McGraw–Hill, Inc., 1993, pp. I–XIV & 1–39.

Primary Examiner—Alpus Hsu
Assistant Examiner—Ricky Ngo
Attorney, Agent, or Firm—Stephen T. Keohane

[57] ABSTRACT

The system and method of the present invention provide a seamless approach for providing ATM connectivity for a Frame Relay DTE using an intelligent Terminal Adapter (TA). Using the system and method of the present invention, an enhanced Frame Relay protocol runs between the DTE and the ATM TA, the Frame Relay DTE is provided with not only the connectivity to the ATM network but also the full advantages of ATM transport mechanism. For instance, the FR DTE can choose to transmit its data using ATM Adaptation Layer (AAL) 1,3/4 or 5. Using the system and method of the present invention, a FR DTE may communicate with another FR DTE or to an ATM DTE through wide area or local area ATM network. The Frame Relay DTE can send data, image, voice, or video traffics across the ATM network via the FR/ATM terminal adapter.

32 Claims, 5 Drawing Sheets

ATM Cell Layout

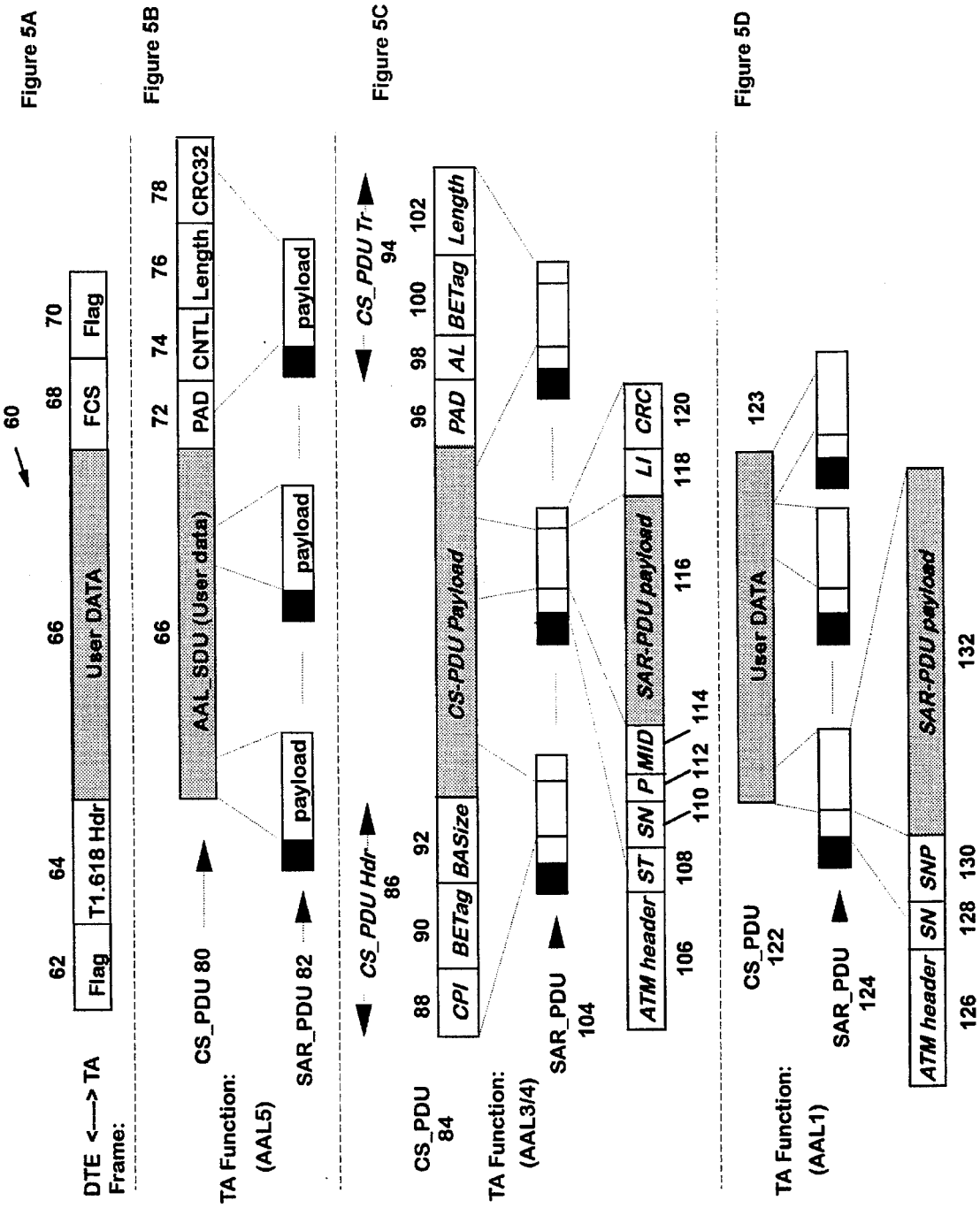

SYSTEM AND METHOD FOR PROVIDING ATM SUPPORT FOR FRAME RELAY DTES WITH A TERMINAL ADAPTER

RELATED APPLICATIONS

This is related to commonly assigned, U.S. application Ser. No. 08/316,675, entitled "System And Method For Providing SVC Service Through An ATM Network For Frame Relay DTEs With A Terminal Adapter" filed concurrently herewith.

BACKGROUND OF THE INVENTION

1. Field of the Invention

The present invention relates to the interworking between Frame Relay and Asynchronous Transfer Mode (ATM) transmission schemes and, more particularly, to a system and method for allowing a FR DTE to communicate with another FR DTE or to an ATM DTE through wide area or local area ATM network.

2. Background of the Invention

Over the past decade, many businesses, through growth and mergers, have dispersed their locations across the country and, in many cases, around the world. In the various business locations, local area networks (LANs) are used for interconnecting groups of people using PCs and workstations. As the popularity of LANs increases, so does the need for the interconnection of those LANs located across the country and around the world.

But as the size and geographic dispersement of these private networks grow, the interconnect expense increases. The cost mid complexity of building and managing these private networks increase exponentially as more equipment, facilities and expertise is required.

Frame Relay is one of the most convincing transmission schemes in today's networking world. The Frame Relay is a frame based transmission technique and has gained a lot of support from the Data Terminal Equipment (DTE) vendors and the end user groups. Frame Relay, a "fast packet" multiplexing specification, is designed to create more efficient wide area networks (WANs) by permitting users to access only the amount of bandwidth they need for a given application. In addition, Frame Relay has been recognized as being able to improve LAN networking solutions by standardizing LAN interconnection techniques and by reducing the number of required leased lines in a network.

Frame Relay is a "connection-oriented" protocol. It establishes a logical connection for the duration of the call, and it is initially being implemented as a permanent virtual circuit (PVC) service. It is a data transport service that operates at layer 2 of the OSI reference model and uses variable length data packets.

Asynchronous Transfer Mode (ATM) has been chosen as the technology for use in the future and, in particular, for supporting Broadband Integrated Services Digital Network (B-ISDN), it can support many types of services at a variety of speeds which makes its particularly appropriate for use with multimedia services that require multiple data channels operating at different speeds.

Frame Relay has emerged as one of the packet technologies in the United States for fractional T1 and T1 rates while ATM is being defined for future implementation at fiber and SONET rates of initially 155 Mb/s and later on 622 Mb/s.

Because of evolutionary considerations, such as interface and protocol standardization and equipment availability, differences in performance characteristics, similarity in technology, and potentially common markets served, these two technologies will have to co-exist for some time. Thus, the interworking between Frame Relay and ATM network has become a very important issue.

The problem is that, because Frame Relay has been available liar some time now, there are presently available DTE which is adapted for interfacing a network supporting the Frame Relay service, or supports the Frame Relay Interface (FRI). In contrast, however, AIM is relatively new and is not widely available, if available at all in many locations. As a result, presently, few DTEs are equipped with ATM support. Furthermore, the DTE supporting ATM (ATM DTE) that is available is relatively expensive and is somewhat redundant to the DTE presently installed that supports Frame Relay (Frame Relay DTE).

Furthermore. ATM provides additional transport capability that Frame Relay does not provide, such as for multimedia traffic. It would be desirable to utilize AIM transport capability with Frame Relay traffic. For instance, AIM supports the user's selection of data priority through the use of ATM Adaptation Layers (AALs). It would be desirable for a FR DTE to be able to take advantage of such flexibility.

Therefore, it is desirable to have a terminal adapter which will interface with the subscriber's Frame Relay DTE (via an FRI) and communications adapter and, on the network side, will interface with an ATM network to communicate with either a Frame Relay DTE or an ATM DTE. It is further desirable to have such a terminal adapter allow the Frame Relay DTE capitalize on the transport capability provided by the ATM to transmit delay/loss sensitive traffic, such as multimedia traffic, through the ATM network without adding any overhead.

SUMMARY OF THE INVENTION

The system and method of the present invention provide a seamless approach for providing ATM connectivity for a Frame Relay DTE using an intelligent Terminal Adapter (TA). Using the system and method of the present invention, an enhanced Frame Relay protocol runs between the DTE and the ATM TA, the Frame Relay DTE is provided with not only the connectivity to the ATM network but also many of the advantages of ATM transport mechanism. For instance, the FR DTE can choose to transmit its data using ATM Adaptation Layer (AAL) 1,3/4 or 5. Using the system and method of the present invention, a FR DTE may communicate with another FR DTE or to an ATM DTE through wide area or local area ATM network. The Frame Relay DTE can send data, image, voice, or video traffics across the ATM network via the FR/ATM terminal adapter.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 5 comprises FIGS. 5A, 5B, 5C and 5D and illustrates a Frame Relay frame as it is conveyed from the FR DTE to the terminal adapter and the ATM cells which are the result of a segmentation of the FR frame and which are conveyed to the ATM network.

DETAILED DESCRIPTION OF THE PREFERRED EMBODIMENT

Figure 1:
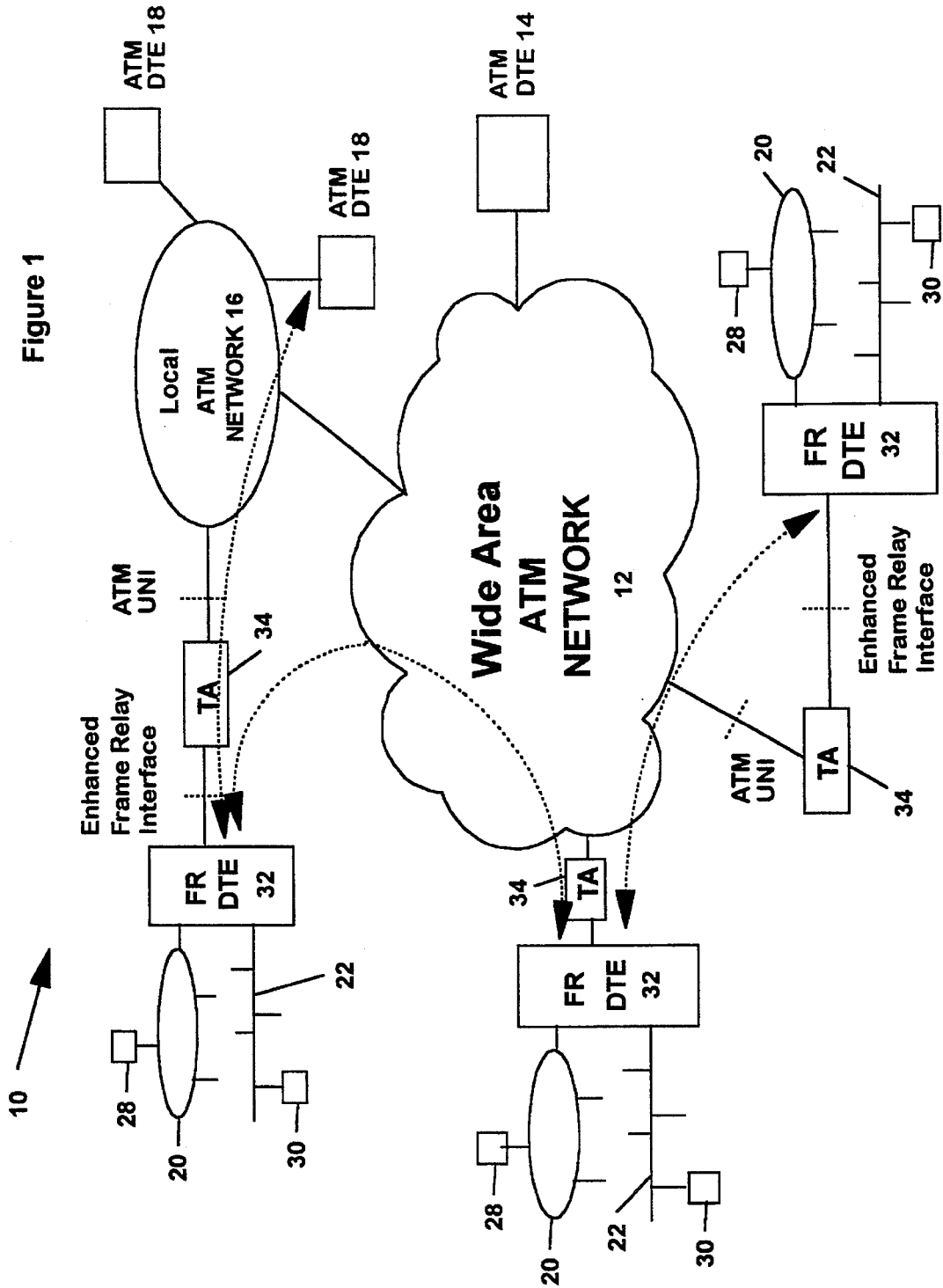
FIG. 1 is a diagram showing the terminal adapter of the present invention as it may be used in a networking environment.

FIG. 1 illustrates a networking environment 10 consisting of a number of individual interconnected networks: a Wide Area ATM Network 12 having an ATM DTE 14 connected thereto; a Local ATM Network 16 having a plurality of ATM DTEs 18 connected thereto: Token Ring Local Area Networks (LANs) 20; and Ethernet LANs 22. The Token Ring LANs 20 and Ethernet LANs 22 have Token Ring and Ethernet workstations 28, 510, respectively, connected thereto. Networking environment 10 further has Frame Relay (FR) DTEs 32 which provide Frame Relay connectivity to the Token Ring and Ethernet LANs 20,22. The FR DTE is a communications product, such as a communications controller, a router, or a channel extender which is used normally to access the Frame Relay services only, but, with the terminal adapter (TA) 34 of the present invention, ATM services also. The ATM DTEs 14, 18, likewise, are communications products adapted to provide access to the ATM services.

In order to describe the terminal adapter of the present invention, a short technology overview of Frame Relay and ATM is needed.

Frame Relay

Frame Relay is a relatively new packet bearer service for data communications at access speeds of up to 2 Mb/s. The two major characteristics of Frame Relay are:

link layer (layer 2) multiplexing logically out of band call control (signaling)

With regard to link layer multiplexing, unlike X.25, where multiplexing is done at Layer 3 (Packet Layer) and inband signaling is used, Frame Relay operates entirely within the link layer. Based on the multiplexing operation of LAPD, it statistically multiplexes different user data streams at this layer. Each user data stream is called a data link connection (DLC). With the use of link layer multiplexing, differentiation of multiple concurrent data flows on a common physical channel is done at the lowest possible layer in the data transfer protocols. The rationale for pushing the multiplexing function downward in the protocol hierarchy is to take advantage of certain technological advances.

Regarding out of band signaling, signaling and control information for Frame Relay are separated from the user plane (U-plane) procedures in one of several ways:

on a physically separate interface on a channel (time slot) different from the one used for data, but within the same interface on a separate logical link within the same channel This principle of separation of the control and user planes in the ISDN protocol reference model is used to distinguish interactions needed for the control and signaling functions from those needed to transfer user data.

Figure 2:
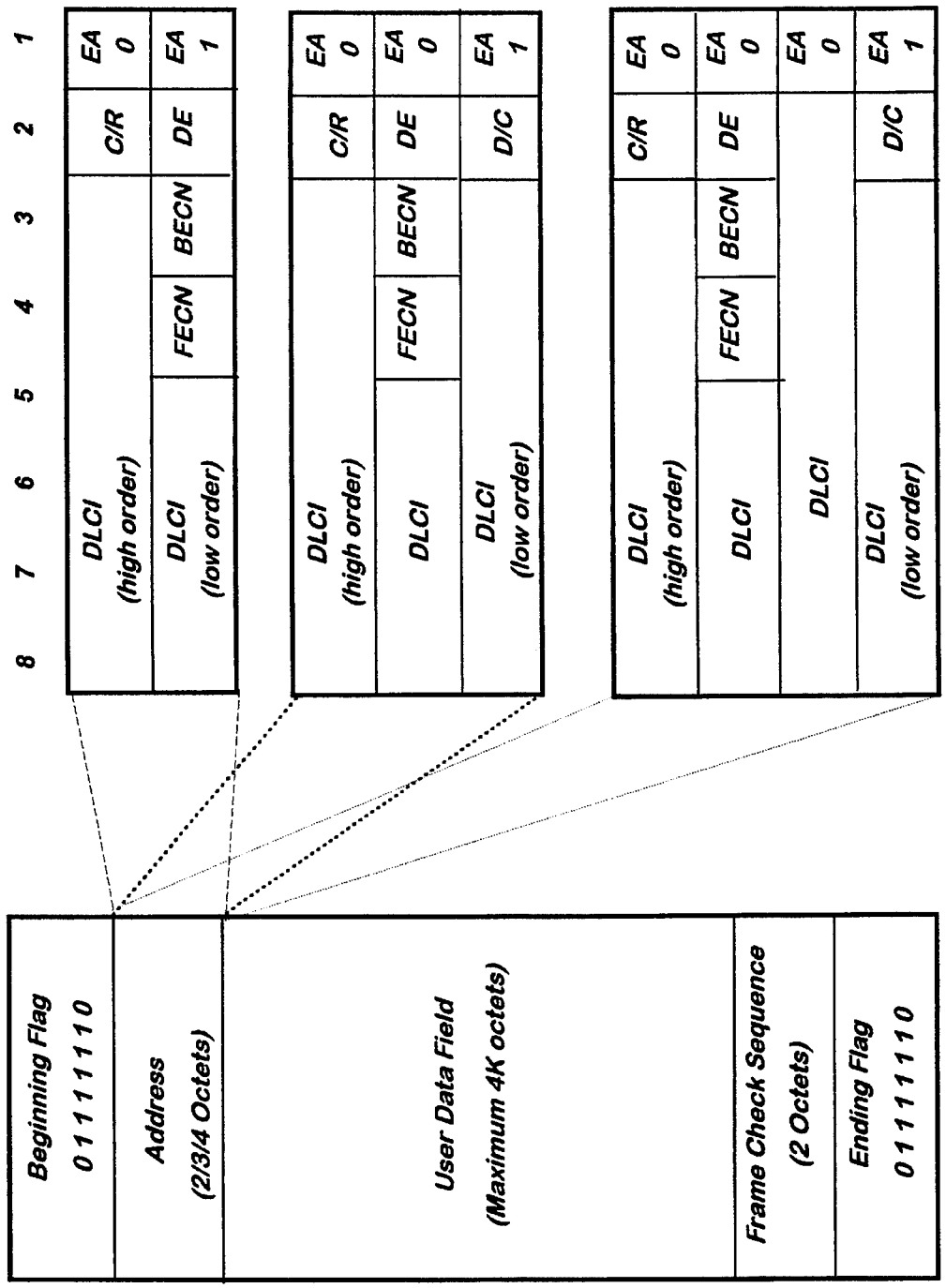
FIG. 2 depicts the frame format of the Frame Relay frame as specified by the ANSI standards.

FIG. 2 illustrates the frame format of the Frame Relay frame as specified by the ANSI standards. (The frame format for data transmission is based upon a subset of Q.921 (LAP-D), but extended with flow control fields. The protocol is known as Link Access Procedure F - Core (LAP - F Core) and is defined in ANSI T1.618-1991: it is also defined in CCITT's Q.922 Annex A.) A Frame Relay frame consists of:

a Flag Sequence—All flames start and end with the flag sequence. The closing flag is preceded by the frame check sequence (FCS):

an Address Field—The Address Field consists of at least two octets but may optionally be extended up to 4 octets through the use of the address field extension bit (EA). The Address Field has the following contents:

a Data Link Connection Identifier (DLCI) field;

a Command/Response (C/R) indicator:

an Extend Address Field (EA) bit;

a Forward Explicit Congestion Notification (FECN) bit;

a Backward Explicit Congestion Notification (BECN) bit; and

Discard Eligibility (DE) bit;

an Information Field—The Information Field consists of an integral number of octets (no partial octets):

a Frame Check Sequence (FCS) Field—A 16-bit sequence for determining data error; and a Closing Flag Sequence.

ATM

ATM is a transfer mechanism which uses fixed sized packets called cells and statistical (label) multiplexing which allows the cells to be assigned on demand. Cells are identified as belonging to a particular logical connection by the Virtual Channel Identifier (VCI) that is carried as a label in the header of every cell. A virtual path, identified by a Virtual Path Identifier (VPI), is a grouping of virtual channels.

ATM is a connection oriented technique and provides a common lower layer transport mechanism for all services. Connection-oriented services fall into two categories: Permanent Virtual Connections (or Circuits) (PVC) and Switched Virtual Connections (or Circuits) (SVC). In a PVC environment, network connections are established via the service-ordering process, and remain in place until another service order is sent to the carrier—analogous to a dedicated line. In an SVC environment, network connections are established dynamically as needed, through signaling process incorporated in the user equipment and supported by the network—analogous to a dial-up link.

ATM supports a number of applications utilizing what are called AIM Adaptation Layers (AALs). The AAL is a layer between the ATM layer and the next higher layer in each of the user, control and management planes. The AAL performs functions required by the user, control and management planes and supports the mapping between the ATM layer and the next higher layer. The functions performed in the AAL depend upon the higher layer requirements. The primary function of the AAL is to segment the continuous or bursty information stream into ATM cells at the transmitting terminal and to reconstruct the source stream at the receiving terminal. This layer can provide buffering, end-to-end error and flow control and multiplexing as needed.

Three AALs are currently defined:

1. AAL 1: Timing required, bit rate constant, connection oriented. This provides a connection-oriented circuit-emulation or a T1 or a T3 point-to-point line.

2. AAL 3/4: Timing not required, bit rate variable, connectionless. This supports a fast packet service such as Switched Multimegabit Data Service (SMDS).

3. AAL 5: Unrestricted (bit rate variable, connection oriented or connectionless), also known as "Class X". Supports fast packet services such as cell-relay service.

Figure 3:
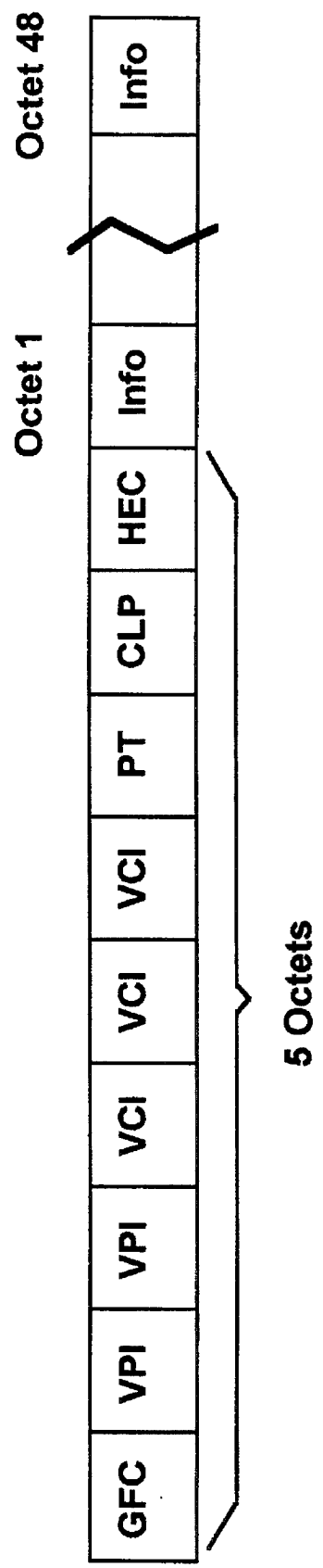
FIG. 3 illustrates an ATM cell layout for the user-network interface (UNI), specified in CCITT Recommendation I.361.

FIG. 3 illustrates an ATM cell layout for the user-network interface (UNI), specified in CCITT Recommendation I.361. The ATM cell comprises the following fields:

- a Generic Flow Control (GFC) Field which allows encoding of 16 states of flow control;
- a Routing Field comprising a virtual path identifier (VPI) and a virtual channel identifier (VCI);
- a Payload Type (PT) Field;
- a Cell Loss Priority (CLP) Field; and
- a Header Error Control (HEC) Field.

Terminal Adapter

Figure 4:
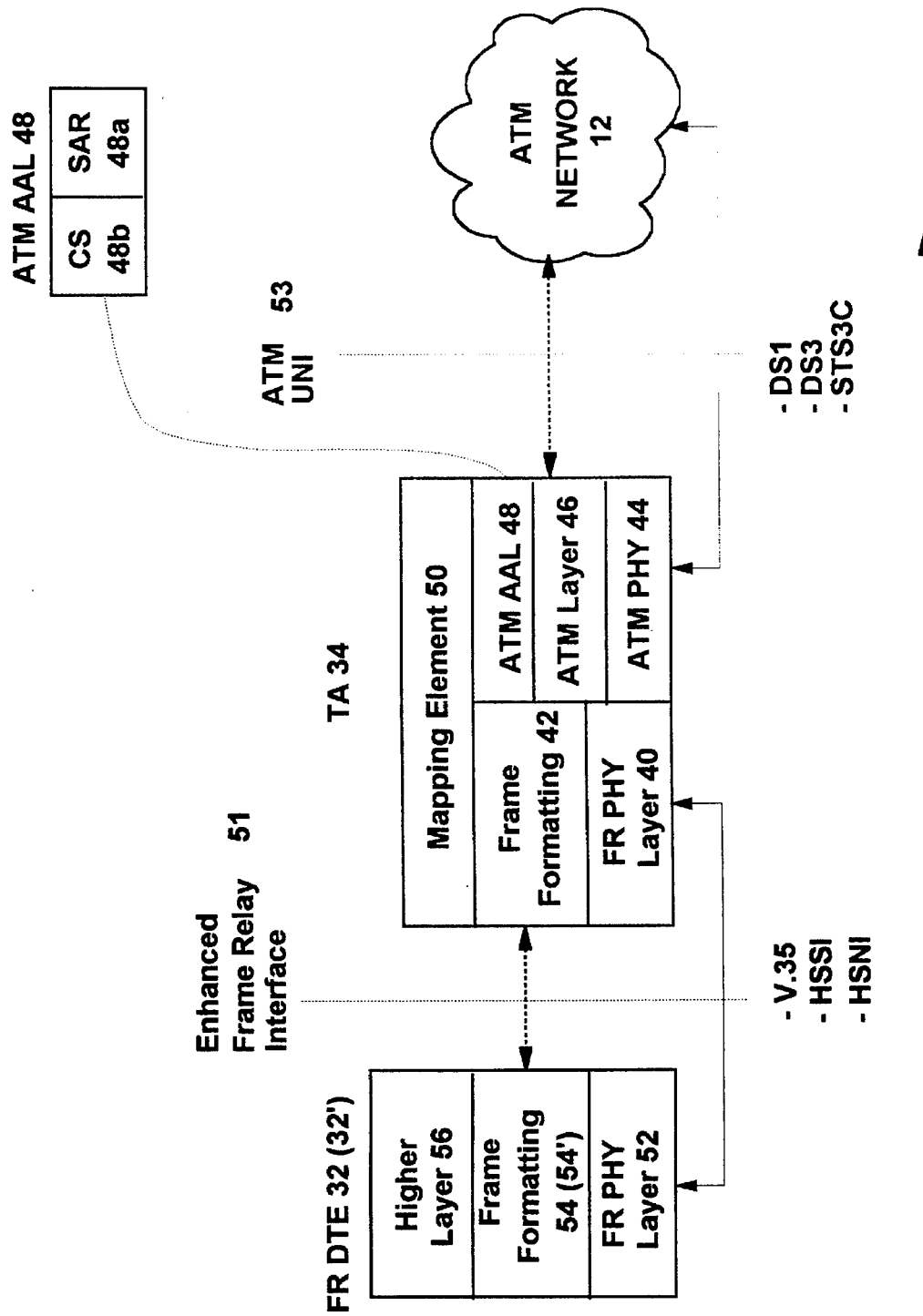
FIG. 4 illustrates the terminal adapter (TA) 34 of the present invention in block diagram form.

FIG. 4 illustrates the terminal adapter (TA) 34 of the present invention in block diagram form, it is connected, on one side, to a FR DTE 32. The FR DTE 32 may have, as shown in FIG. 1, a token ring network and/or an Ethernet network connected thereto but such connections are not shown for simplicity.

The terminal adapter 34 has a number of elements: a Frame Relay physical layer element (FR PHY Layer 40), a frame formatting element 42, an ATM physical layer element (ATM PHY 44), an ATM Layer element 46, ATM AAL Layer 48, and a Mapping element 50. Each of these elements performs a unique function for the terminal adapter 34 and together they provide, on the Frame Relay side, an enhanced Frame Relay User-Network Interface (UNI) 51 and, on the ATM side, an ATM UNI 53.

In particular, the FR physical layer element 40 provides the physical interface to the Frame Relay network and, thus, must conform to the Frame Relay protocols, i.e., RS422, X.21, V.35 (fast RVX), High Speed Serial Interface (HSSI), or High Speed Network Interface (HSNI). The frame formatting element 42 performs the frame formatting for data transfer which is based on a subset of CCITT Q.921 (LAP-D), but extended with flow control fields. This protocol is now known as Link Access Procedure F - Core (LAP-F Core) and is defined by ANSI T1.618. In addition, the frame formatting element 42 supports an enhanced form of the T1.618 (T1.618') so that FR DTEs, also supporting T1.618', may take advantage of the additional transport characteristics of the ATM network. (For the purposes of this specification, the enhanced frame relay interface, which is an enhanced form of the T1.618 standard, is also indicated by T1.618'. Likewise, for remainder of this specification, a prime (') following a numeral indicates an element supporting T1.618'.) Together, these elements provide the enhanced FR UNI 51. This will be discussed below.

On the ATM side, the terminal adapter 34 further has an ATM physical layer element (ATM PHY 44) which connects the terminal adapter to the ATM network. The ATM physical layer element 44 performs a number of physical medium dependent functions such as providing bit transmission capability including bit transfer, bit alignment, line coding, and electrical-optical transformation. In addition, the ATM physical layer element 44 performs other functions such as cell delineation, cell rate decoupling, transmission frame generation and recovery and transmission frame adaptation. There are a number of different public and private interfaces presently specified—a 44.736 Mbps, a 100 Mbs, a 51 Mbps, and two 155.52 Mbps interfaces are specified and a different rate is being considered for UTP cable. The physical transmission system for both public and private user-network interface is based on the Synchronous Optical Network (SONET) standards. Through a framing structure, SONET provides the payload envelope necessary for the transport of ATM cells. The channel operates at 155.52 Mbps and conforms to the Synchronous Transport Signal Level 3 Concatenated (STS-3c) frame. The interface physical characteristics must comply with the SONET Physical Media Dependent (PMD) Sublayer criteria specified in ECSA T1 E1.2/92-020. Other interfaces (for DS3, 100 Mbps Multimode Fiber, 155 Mbps Multimode Fiber using 8B/10B and UTP) are also defined. ATM physical layer element 44 need only comply with the specific interface which it is connected to.

Above the AIM physical layer element 44 is the ATM layer element 46. The ATM layer element 46 provides for the transparent transfer of fixed-size ATM layer service data units (ATM-SDUs) to and from the ATM AAL layer element 48. This transfer occurs on a pre-established ATM connection with negotiated parameters such as cell-loss ratio, cell delay, cell delay variations, throughput, and traffic parameters.

Above the ATM layer element 46 is the ATM AAL element 48. The AAL element is divided into a Segmentation and Reassembly sublayer element (SAR 48a) and a Convergence sublayer element (CS 48b), the Convergence sublayer providing service to applications. AAL element 48 supports the three AAL types defined above—AAL Type 1, AAL Type 3/4, and AAL Type 5.

Together these ATM elements provide the terminal adapter 34 with the ATM UNI 53.

On top of both the AAL element 48 and the Frame Formatting element 42 is the Mapping element 50. The Mapping element 50 is utilized to map the data received from the Frame Relay side through the Frame Formatting element 42 to data to be transmitted through the ATM side through the ATM physical layer element, and vice versa. The Mapping element 50 performs address mapping function for DLCI to VPI/VCI addresses, and performs code interpretation to be discussed.

The FR DTE 32 also has a number of elements—some of which correspond to the terminal adapter elements. At the bottom, FR DTE 32 has a physical layer element (FR PHY Layer 52) which provides the physical interface to the Frame Relay network (corresponding to FR PHY Layer 40 of the terminal adapter). Above the physical layer element 52 is the frame formatting element 54 which performs the frame formatting for data transfer. The frame formatting element 54 may or may not be enhanced, that is, may confirm to either T1.618 or T1.618'. (The enhanced version of the element is indicated by reference numeral 54'.) The enhanced frame formatting element 54' allows the FR DTE to communicate with an ATM DTE, or with another FR DTE but also utilizing the advantages provided by the ATM network 12. But, in any case, both FR DTE 32 and 32' can utilize the terminal adapter of the present invention. Above the frame formatting element 54 (54') is the Higher Layer element 56 which performs higher layer functions of the DTE.

In operation, where the FR DTE 32 (32') wishes to communicate with another communications unit via the ATM network using the terminal adapter 34 of the present invention, it must have some a priori knowledge. For instance, it must know the address of the destination communications unit. (This obviously is the case in any communications scheme.) Where the destination communications unit is another FR DTE, the source FR DTE 32 (32') must know the DLCI of the destination FR DTE so that the frame may be properly routed. Likewise, where the destination communications unit is an ATM DTE, the source FR DTE 32 (32') must know the VPI/VCI of the destination ATM DTE. But, because the FR DTE must have the enhanced version of the frame formatting element (54') to communicate with an ATM DTE, only FR DTE 32' can do so.

Furthermore, in order for the FR DTE to take advantage of the various services available via ATM (FR DTE 32' only), the FR DTE must know which type of service is required by the data to be transmitted. For example, the FR DTE 32' may specify QOS, and, if the FR DTE 32' wishes to exploit the use of the ATM Adaptation Layers (AAL 1, 3/4, 5), it must specify which AAL to use to the terminal adapter.

The terminal adapter can determine from the received frame from the FR DTE the destination DTE (frown the DLCI) and the type of service requested (from the FECN, BECN and DE bits—bits 2, 3, and 4 of address octet 2, 3, or 4 depending upon the address field size). A FR DTE having the enhanced Frame Relay interface can set or reset the FECN, BECN and DE bits (or Payload Type (PT) bits) prior to conveying the frame to the terminal adapter 34. A FR DTE not having the enhanced interface cannot. The terminal adapter, upon receiving a frame, examines the PT bits and determines, based upon their respective values, the type of service required by the FR DTE. The terminal adapter makes the determination based upon the coding table below (Table 1).

TABLE 1

| PT Coding and Interpretation | | | |
| --- | --- | --- | --- |
| 4 (FECN) | 3 (BECN) | 2 (DE) | Description |
| 0 | 0 | 0 | AAL5 Support, No Discard |
| 0 | 0 | 1 | AAL5 Support, Discardable |
| 0 | 1 | 0 | AAL¾ Support, No Discard |
| 0 | 1 | 1 | AAL¾ Support, Discardable |
| 1 | 0 | 0 | AAL1 Support, No Discard |
| 1 | 0 | 1 | AAL1 Support, Discardable |
| 1 | 1 | 0 | Reserved |
| 1 | 1 | 1 | Reserved |

As can be seen in Table 1, based upon the specified PT parameters, the AAL (AAL1, AAL3/4, or AAL5) can be chosen. Likewise, the QOS (No Discard or Discardable) may be chosen.

Using the terminal adapter of the present invention, a FR DTE 32 not having the enhanced frame formatting element 54' can communicate through the ATM network with another FR DTE without utilizing any additional ATM capabilities (e.g.. choosing QOS, AAL, etc.) and without even knowing that the terminal adapter (or the ATM network) is there. In other words, the terminal adapter and the ATM network are transparent to the FR DTE 32. In such a case, the FR DTE 32 merely conveys a frame (such as Frame 60 shown in FIG. 5A) conforming to the Frame Relay formatting protocol having the DLCI of the destination FR DTE in the T1.618 Hdr 64 to the terminal adapter 34. The frame is received by the FR PHY Layer 40 which conveys it to the frame formatting clement 42. The frame formatting clement 42 performs such functions as stripping off the beginning flag 62 and ending flag 70 and performing any error correction based upon the FCS 68. The T1.618 field 64 (address) and the user data field 66 are passed to the Mapping element 50.

Based upon the DLCI value, the Mapping element 50 knows that the destination DTE is a FR DTE and that there needs to be some address mapping conducted. The Mapping element 50 performs an address look-up based upon the DLCI of the destination FR DTE and determines the corresponding VPI/VCI of the destination DTE. (The address mapping table must be previously installed in the terminal adapter, for example, by remotely downloading it.) The VPI/VCI and the user data field 66 are passed to the AAL element 48 for ATM Adaptation layer processing. Because all of the PT bits are reset, the default AAL service is AAL 5—No Discard. (AAL 5 is a simple and efficient adaptation layer for data.) As shown in FIG. 5B, the user data 66 is appended with a PAD field 72, a CNTL field, a 2 byte length field (Length 76), and a 4 byte CRC (CRC32 78). This forms the AAL5—CS_PDU 80 which is conveyed to the ATM Layer 46.

ATM Layer 46 segments these CS_PDUs 80 into AAL5—SAR_PDUs 82 (or ATM cells) also shown in FIG. 5B. The segmentation process is in accordance with the ATM protocols. The SAR_PDUs 82 are conveyed to the ATM PHY Layer 44 for transmission on the ATM network.

If the FR DTE supports the enhanced FR UNI, it can take full advantage of the ATM capabilities by specifying the various parameters that it wishes to utilize. Further, it can communicate with an ATM DTE by specifying the ATM DTE's VPI/VCI. In particular, the FR DTE, as above, conveys to the terminal adapter 34 a FR frame. Utilizing the PT field, however, the FR DTE can take advantage of the various services offered by ATM. For instance, where the FR DTE wishes to convey real time video, the FR DTE would choose AAL Type I service because it receives and delivers data at a constant bit rate. It also transfers timing information between the source and the destination, in particular, recovery of source frequency is provided. On the other hand, where lime-insensitive data is being transmitted, the FR DTE may choose either AAL 3/4 or 5 service based upon the prices charged for each type of service.

Where the FR DYE supports the enhanced FR UNI, it can select any of the AAL services, i.e., AAL 1, AAL 3/4 or AAL 5, as well as the cell loss priority ("Discardable" or "No Discard"). In addition, the FR DTE can communicate with an ATM DTE. In order to do so, the FR DTE conveys a frame conforming to T1.618' (enhanced T1.618) having the VPI/VCI of the destination ATM (or FR) DTE in the DLCI fields of the frame depicted in FIG. 2 and the selected service as indicated by the PT fields. As above, the FR PHY Layer element 40 of the terminal adapter 34 receives the frame and conveys it to the frame formatting element 42. The frame formatting element 42 which strips off the flags and performs error correction. The frame forwarding element 42 forwards the User Data and the T1.618' header to the Mapping element 50 which determines which services, are requested by the FR DTE based upon the PT. The Mapping element 50 forwards the User data along with the source and destination VPI/VCIs and the service requested to the AAL Layer element 48.

As indicated in Table 1. if the PT field indicates a "010" (AAL3/4—No Discard) or a "011" (AAL3/4—Discardable). AAL 3/4 service is requested by the Mapping element 50. As shown in FIG. 5C, the AAL Layer element 48 builds a plurality of CS_PDUs 84 comprising a CS_PDU Hdr 86 (having a CPI field 88, a BETag field 90, and a BASize field 92) and a CS_PDU Tr 94 (having a PAD field 96, an AL field 98, a BETag field 100, and a Length field 102). The CS_PDUs 84 are conveyed to the ATM Layer element 46. The ATM Layer clement 46 segments the CS_PDUs 84 into ATM cells 104, each cell consisting of an ATM header field 106, an ST field 108, an SN field 110, a P field 112, a MID field 114, a SAR_PDU payload field 116, and LI field 118 and a CRC (Cyclic Redundancy Check) field 120.

If the PT field indicates a "100" (AAL1—No Discard) or a "101" (AAL1—Discardable), AAL 1 service is requested by the Mapping element 50. As shown in FIG. 5D, the AAL Layer element 48 builds a plurality of CS_PDUs 122 comprising only the User Data 123. The CS_PDUs 122 are conveyed to the ATM Layer element 46. The ATM Layer element 46 segments the CS_PDUs 122 into ATM cells 124, each cell consisting of an ATM header field 126, an SN field 128, an SNP field 130, and a SAR_PDU payload field 132.

In the other direction, where the FR DTE 32 (32') is receiving data from another DTE, the procedure described above is performed in the opposite order. The ATM PHY Layer element 44 receives ATM cells and forwards them to the ATM Layer element 46. The ATM Layer element 46 reassembles them into CS_PDUs and forwards them to the ATM AAL Layer element 48. The ATM AAL Layer element 48 disassembles the CS_PDUs and forwards to the Mapping element 50 the User Data, the addresses, and other pertinent information such as the service used. The Mapping element 50 builds a T1.618 (or T1.618') Hdr and forwards the header and the data to the frame formatting element 42. The frame formatting element 42 builds the FR frame for transmission to the FR DTE.

For AAL1 cells received by the terminal adapter 34, a frame will be sent to the FR DTE 32' by the terminal adapter if the frame length reaches "L" bytes in a given amount of time, both of which are predefined by the FR DTE 32' and terminal adapter. If the frame length does not reach "L" bytes in that time, the frame will conveyed to the FR DTE in any case in order to limit delay. A timer is used to determine the given amount of time for each AAL1 frame.

Thus, it can be seen that the method and system of the present invention provide a mechanism for adapting a native Frame Relay DTE for use with an ATM network—either for communicating with an ATM DTE or another Frame Relay DTE using a terminal adapter of the present invention. While the invention has been particularly shown and described with reference to preferred embodiments thereof, it will be understood by those skilled in the art that various other changes in form and detail may be made without departing from the spirit and scope of the invention.

What is claimed is:

1. For use with a frame relay terminating equipment (FR DTE) and an asynchronous transfer mode (ATM) network having one or more communications units connected thereto, a terminal adapter for providing an interface to said ATM network for said FR DTE so that said FR DTE is able to communicate with said one or more communications units, said terminal adapter comprising:

a mapping element;

a FR DTE interface connected to said mapping element, said FR DTE interface comprising means for receiving frame relay (FR) frames from said FR DTE and for conveying FR frames to said FR DTE, each FR frame comprising header and a trailer and a selected ATM Adaptation Layer (AAL) service identifier for identifying one of a set of AAL services by which said FR frame is to be conveyed over said ATM network, means for building information packets by stripping the header and trailer off of each FR frame received from said FR DTE, means for conveying said information packets to said mapping element, means for receiving information packets from said mapping element, and means for building FR frames by adding a header and a trailer to each information packet to be conveyed to said FR DTE; and an ATM network interface connected to said mapping element, said ATM network interface comprising means for receiving ATM cells from said ATM network and for conveying ATM cells to said ATM network, means for building protocol data units (PDUs) by reassembling ATM cells received from said ATM network, means for conveying said PDUs to said mapping element, means for receiving PDUs from said mapping element, and means for building ATM cells to be conveyed to said ATM network by segmenting said PDUs, said mapping element comprising means for receiving information packets from said FR DTE interface, means for examining said selected AAL service identifier and for identifying the selected AAL service, means for building PDUs based upon the contents of said information packets including said AAL service identifier, means for conveying PDUs to said ATM network interface, means for receiving PDUs from said ATM network interface, means for building information packets based upon the contents of said PDUs, and means for conveying information packets to said FR DTE interface.

2. The terminal adapter defined in claim 1 wherein each FR frame has a Data Link Connection Identifier (DLCI), and said mapping element further comprises means for mapping said DLCIs to Virtual Path Identifier/Virtual Channel Identifiers (VPI/VCIs), said PDU building means using said VPI/VCIs to build said PDUs.

3. The terminal adapter defined in claim 2 wherein each FR frame further has a payload type field, said payload type field comprising said selected AAL service identifier.

4. The terminal adapter defined in claim 3 wherein said payload type field comprises a forward explicit congestion notification (FECN), a backward explicit congestion notification (BECN) and a discard eligibility (DE) bit and further wherein said selected AAL service identifying means uses these bits to identify said selected AAL service.

5. The terminal adapter defined in claim 4 wherein said payload type field further identifies a selected quality of service (QOS) and further wherein said selected AAL service identifying means further uses said FECN, BECN and DE bits to identify the selected QOS.

6. The terminal adapter defined in claim 1 wherein said communications unit is an ATM DTE and further wherein each FR frame further has a Virtual Path Identifier/Virtual Channel identifier (VPINCI) for identifying the address of said ATM DTE and said mapping means further comprises means for recognizing said VPI/VCI and passing it through to said ATM network interface.

7. The terminal adapter defined in claim 6 wherein each selected AAL service identifier has a forward explicit congestion notification (FECN), a backward explicit congestion notification (BECN) and a discard eligibility (DE) bit and further wherein said selected AAL service identifying means uses these bits to identify said selected AAL service.

8. The terminal adapter defined in claim 7 wherein said selected AAL service identifier further identifies a selected quality of service (QOS) and further wherein said selected AAL service identifying means further uses said FECN, BECN and DE bits to identify the selected QOS.

9. The terminal adapter defined in claim 1 or in claim 2 wherein said communications unit is a FR DTE.

10. The terminal adapter defined in claim 1 or in claim 6 wherein said communications unit is an ATM DTE.

11. The terminal adapter defined in claim 1 wherein said FR DTE interface further comprises means for performing error correction on each received FR frame.

12. A method for use in a terminal adapter connected between a frame relay terminating equipment (FR DTE) and an asynchronous transfer mode (ATM) network having one or more communications units connected thereto, said terminal adapter for providing an interface to said ATM network for said FR DTE so that said FR DTE is able to communicate with said one or more communications units, said terminal adapter comprising a mapping element, a FR DTE interface connected to aid mapping element and an ATM network interface connected to said mapping element, said method comprising the steps of:

in said FR DTE interface, receiving flame relay (FR) frames from said FR DTE and conveying FR frames to said FR DTE, each FR flame comprising a header and a trailer and a selected ATM Adaptation Layer (AAL) service identifier for identifying one of a set of AAL services by which said FR frame is to be conveyed over said ATM network, building information packets by stripping the header and trailer off of each FR frame received from said FR DTE, conveying said information packets to said mapping element, receiving information packets from said mapping element, and building FR frames by adding a header and a trailer to each information packet to be conveyed to said FR DTE; and in said ATM network interface, receiving ATM cells from said ATM network and for conveying ATM cells to said ATM network, building protocol data units (PDUs) by reassembling ATM cells received from said ATM network, conveying said PDUs to said mapping element, receiving PDUs from said mapping element, and building ATM cells to be conveyed to said ATM network by segmenting said PDUs, in said mapping element, receiving information packets from said FR DTE interface, examining said selected AAL service identifier and for identifying the selected AAL service, building PDUs based upon the contents of said information packets including said AAL service identifier, conveying PDUs to said ATM network interface, receiving PDUs from said ATM network interface, building information packets based upon the contents of said PDUs, and conveying information packets to said FR DTE interface.

13. The method defined in claim 12 wherein each FR Frame has a Data Link Connection Identifier (DLCI), and said method further comprises, in said mapping element, the steps of mapping said DLCIs to Virtual Path Identifier/Virtual Channel Identifiers (VPI/VCIs), and using said VPI/VCIs to build said PDUs.

14. The method defined in claim 13 wherein said communications unit is an ATM DTE and further wherein each FR frame further has a Virtual Path Identifier/Virtual Channel Identifier (VPI/VCI) for identifying the address of said ATM DTE and said method means further comprises in said mapping element, the steps of recognizing said VPINCI and passing it through to said ATM network interface.

15. The method defined in claim 14 wherein said selected AAL service identifier has a forward explicit congestion notification (FECNE), a backward explicit congestion notification (BECN) and a discard eligibility (DE) bit and further wherein said method further comprises, in said mapping element, the step of using these bits to identify said selected AAL service.

16. The method defined in claim 15 wherein said AAL service identifier further identifies a selected quality of service (QOS) and further wherein said method further comprises, in said mapping element, using said FECN, BECN and DE bits to identify the selected QOS.

17. The method defined in claim 12 wherein said method further comprises the step of performing error correction on each received FR frame.

18. For use with in an Asynchronous Transfer Mode (ATM) network having one or more communications units connected thereto, a system for communicating with said one or more communications units over said ATM network comprising:

means for generating and conveying flame relay (FR) frames, each FR frame comprising a header and a trailer and a selected ATM Adaptation Layer (AAL) service identifier for identifying one of a set of AAL services by which said FR frame is to be conveyed over said ATM network;

a mapping element;

an FR interface connected between said FR frame conveying means and said mapping element, said FR interface comprising means for receiving said FR frames from said FR frame conveying means, means for building information packets from each FR frame received from said FR frame conveying means, and means for conveying said information packets to said mapping element; and an ATM network interface connected to said mapping element, said ATM network interface comprising means for conveying ATM cells to said ATM network, means for receiving protocol data units (PDUs) from said mapping element, and means for building ATM cells to be conveyed to said ATM network by segmenting said PDUs, said mapping element comprising means for receiving information packets from said FR interface, means for examining said selected AAL service identifier and for identifying the selected AAL service, means for building PDUs based upon the contents of said information packets including said AAL service identifier, and means for conveying PDUs to said ATM network interface.

19. The system defined in claim 18 wherein each FR frame has a Data Link Connection Identifier (DLCI), and said mapping element further comprises means for mapping said DLCIs to Virtual Path Identifier/Virtual Channel Identifiers (VPI/VCIs), said PDU building means using said VPI/VCIs to build said PDUs.

20. The system defined in claim 19 wherein each FR frame further has a payload type field, said payload type field comprising said selected AAL service identifier.

21. The system defined in claim 20 wherein said payload type field comprises a forward explicit congestion notification (FECN), a backward explicit congestion notification (BECN) and a discard eligibility (DE) bit and further wherein said selected AAL service identifying means uses these bits to identify said selected AAL service.

22. The system defined in claim 21 wherein said payload type field further identifies a selected quality of service (QOS) and further wherein said selected AAL service identifying means further uses said FECN, BECN and DE bits to identify bits to identify the selected QOS.

23. The system defined in claim 18 wherein said communications unit is an ATM DTE and further wherein each FR frame further has a Virtual Path Identifier/Virtual Channel identifier (VPI/VCI) for identifing the address of said ATM DTE and said mapping means further comprises means for recognizing said VPI/VCI and passing it through to said ATM network interface.

24. The system defined in claim 23 wherein each FR frame has a forward explicit congestion notification (FECN), a backward explicit congestion notification (BECN) and a discard eligibility (DE) bit and further wherein said selected AAL service identifying means uses these bits to identify said selected AAL service.

25. The system defined in claim 24 wherein said FR frame further identifies a selected quality of service (QOS) and further wherein said selected AAL service identifying means further uses said FECN, BECN and DE bits to identify the selected QOS.

26. The system defined in claim 18 or in claim 19 wherein said communications unit is a FR DTE.

27. The system defined in claim 18 or in claim 23 wherein said communications unit is an ATM DTE.

28. The system defined in claim 18 wherein said FR interface further comprises means for performing error correction on each received FR frame.

29. The system defined in claim 18 wherein said FR interface further comprises means for conveying FR frames to said FR frame conveying means, means for receiving information packets from said mapping element, and means for building FR frames by adding a header and a trailer to each information packet to be conveyed to said FR frame conveying means.

30. The system defined in claim 29 wherein said ATM network interface further comprises means for receiving ATM cells from said ATM network, means for building PDUs by reassembling ATM cells received from said ATM network, means for conveying said PDUs to said mapping element.

31. The system defined in claim 30 wherein said mapping element further comprises means for receiving PDUs from said ATM network interface, means for building information packets based upon the contents of said PDUs, and means for conveying information packets to said FR interface.

32. A frame relay terminating equipment (FR DTE) for communicating over an asynchronous transfer mode (ATM) network having one or more communications units connected thereto, via terminal adapter for providing an interface to said ATM network for said FR DTE so that said FR DTE is able to communicate with said one or more communications units, said terminal adapter comprising a mapping element, a FR DTE interface for receiving frame relay (FR) frames from said FR DTE, an ATM network interface connected to said ATM network for conveying ATM cells to said ATM network from said terminal adapter, a mapping element connected between said FR DTE interface and said ATM network interface for providing an interface therebetween, said FR DTE comprising:

means for building frame relay (FR) frames, each FR frame comprising a beginning flag, an ending flag, a user data field, a frame check sequence field, and an address field, said address field comprising a data link connection identifier (DLCI), a forward explicit congestion notification (FECN) bit, a backward explicit congestion notification (BECN) bit, and a discard eligibility (DE) bit, the FECN bit, the BECN bit, and the DE bit comprising a selected ATM Adaptation Layer (AAL) service identifier for identifying one of a set of AAL services by which said FR frame is to be conveyed over said ATM network; and means for conveying said FR frames to said terminal adapter.

\* \* \* \* \*